Patented Jan. 5, 1943

2,307,091

UNITED STATES PATENT OFFICE 2,307,091

VINYL RESIN MOLDING COMPOSITIONS

Victor Yngve, Lakewood, Ohio, assignor to Carbide and Carbon Chemicals Corporation, a corporation of New York No Drawing. Application September 12, 1940, Serial No. 356,525

3 Claims. (Cl. 260—36)

Molding compositions composed of vinyl resins are characterized by their strength and toughness, by their resistance to water, to corrosive chemicals and to many organic solvents, by their stability to heat and light, especially when combined with stabilizing ingredients, by their electrical insulating properties, and by their thermoplasticity which enables a number of different shaped articles to be accurately molded from them. Thus, these vinyl resin molding compositions may be fabricated by the usual molding processes into phonograph records, toothbrush handles, dentures, novelties, combs, flexible or rigid sheet materials and the like. Furthermore, these articles may vary in form from clear and transparent varieties to opaque and highly filled modifications.

Vinyl resin molding compositions for use in certain of the applications mentioned above often contain vinyl resins of high softening points or they contain large amounts of fillers. For this reason, such compositions are usually modified by the inclusion of extremely high-boiling solvents or plasticizers which act to increase the plasticity of the composition at the molding temperatures. An illustration of the use of filled vinyl resin molding compositions is in the production of phonograph records where, for imparting adequate resistance to wearing, it is necessary to include at least some filler with the vinyl resin and for economic reasons, it is desirable to use as large an amount of filler as possible. The desirability of plasticizing highly filled molding compositions for phonograph records is particularly evident because the large amounts of fillers present tend to decrease the plasticity of the composition at the molding temperature to a point where the impression of an accurate sound track is difficult. As a result, in order to secure accurately molded phonograph records from unplasticized compositions, it is necessary to increase the molding time or the molding pressure, and in some cases, both. These expedients not only make the molding operation more expensive but they frequently are unsuccessful as well.

According to this invention, a highly effective type of plasticizer for vinyl resin molding compositions, particularly for those used in making phonograph records, has been developed. These plasticizers are the alkyl substituted phenanthrenes of which I prefer to use retene (1-methyl, 7-isopropyl phenanthrene). It is understood that either a purified retene or a technical grade may be used. I prefer to use the technical grade because of its lower cost. It contains varying percentages of impurities, which may or may not be chemically related, but these impurities do not affect the usefulness of the plasticizer. The alkyl substituted phenanthrenes are readily derived from coal tar fractions or from rosin by distillation with sulfur. As compared to known plasticizers for vinyl resin molding compositions, they possess the advantage of being materially lower in cost so that the plasticity of the composition at the molding temperature can be increased to any practical degree without increasing the comparative costs of the respective compositions. The use of these new plasticizers for this purpose is especially advantageous in that, while they soften the vinyl resins at molding temperatures, they do not materially lower the softening temperature of the molded article. In addition, the new plasticizers are characterized by a high degree of compatibility with vinyl resins which insures the production of molded articles of good quality from the plasticized composition.

In the formulation of vinyl resin molding compositions for phonograph records, the percentage of alkyl substituted phenanthrene to be employed depends directly on the amount of filler which is present and inversely on the molding pressure and temperature to be employed. In practice, it is preferable to use amounts of these plasticizers varying from about 5 to 25 per cent by weight of the vinyl resin present, the actual amount included being dependent on the conditions selected.

The vinyl resins which are preferred in the practice of this invention are conjoint polymers of vinyl halides with vinyl esters of aliphatic acids having combined vinyl halide contents in excess of 70%. A particularly desirable resin of this class is a conjoint polymer of vinyl chloride with vinyl acetate containing 87% vinyl chloride and having an average macromolecular weight of about 10,000 as determined by Staudinger's method. Less desirably, other vinyl resins may be employed as the base of the molding compositions, such as the more highly polymerized polyvinyl acetate resins and the polyvinyl acetal resins derived from them by their partial or complete hydrolysis and subsequent reaction with aldehydes.

Examples of molding compositions containing an alkyl substituted phenanthrene which are adapted for use in making sound records are as follows:

|  | Parts by weight | |
| --- | --- | --- |
|  | A | B |
| Conjoint polymer of vinyl chloride with vinyl acetate | 40.0 | 60.0 |
| Retene | 6.0 | 4.0 |
| Calcium stearate | .67 | 0.8 |
| Carnauba wax | .67 | 0.8 |
| Diatomaceous earth | 52.66 | 34.4 |

Records may be formed from these compositions by first mixing the ingredients in a heated dough-type mixer until they are homogeneous and then pressing the composition into preforms. This may be done at temperatures of 130° to 150° C. and at pressures up to 2000 pounds per square inch. The impression of the sound groove is then accomplished by pressing the heated preform against an appropriate die. The entire molding cycle can be carried out very rapidly without impairing the quality of the records.

The formulations shown in the foregoing examples may be varied by the addition of pigments and dyes or by the substitution of other waxes, lubricants, heat stabilizers, and filling materials for those specifically shown. Other modifications will be apparent to those skilled in the art and are included within the scope of the invention as defined by the appended claims.

I claim:

1. A molding composition comprising a base of a conjoint polymer of vinyl chloride with vinyl acetate and retene as a plasticizer amounting to from 5 to 25% by weight of said conjoint polymer, said molding composition being characterized by a plasticity at molding temperatures greater than, and by a softening temperature not materially lower than, that of the composition without the plasticizer.

2. A molding composition adapted for making phonograph records comprising a base of a conjoint polymer of vinyl chloride with vinyl acetate, a filling material, and from about 5% to 25% by weight of said conjoint polymer of retene as a plasticizer, said molding composition being characterized by a plasticity at molding temperatures greater than, and by a softening temperature not materially lower than, that of the composition without the plasticizer.

3. A molding composition adapted for making phonograph records comprising a base of a conjoint polymer of vinyl chloride with vinyl acetate, diatomaceous earth as a filling material, and retene as a plasticizer amounting to from 5 to 25% by weight of said conjoint polymer, said molding composition being characterized by a plasticity at molding temperatures greater than, and by a softening temperature not materially lower than, that of the composition without the plasticizer.

VICTOR YNGVE.